United States Patent
Hurula et al.

(10) Patent No.: US 7,949,368 B2
(45) Date of Patent: May 24, 2011

(54) ACCESSORY FUNCTIONS

(75) Inventors: Mika Hurula, Halikko (FI); Jani Tu Niemi, Pernio (FI); Jarmo Saari, Turku (FI); Tapio Mantysalo, Hevonpaa (FI)

(73) Assignee: Nokia Corporation, Espoo (FI)

( * ) Notice: Subject to any disclaimer, the term of this patent is extended or adjusted under 35 U.S.C. 154(b) by 962 days.

(21) Appl. No.: 10/584,696

(22) PCT Filed: Dec. 24, 2004

(86) PCT No.: PCT/IB2004/004375
§ 371 (c)(1),
(2), (4) Date: Jun. 4, 2007

(87) PCT Pub. No.: WO2005/067273
PCT Pub. Date: Jul. 21, 2005

(65) Prior Publication Data
US 2007/0270184 A1 Nov. 22, 2007

(30) Foreign Application Priority Data

Dec. 30, 2003 (GB) .................................. 0330190.0

(51) Int. Cl.
*H04B 1/38* (2006.01)
(52) U.S. Cl. .................................. 455/556.1; 379/449
(58) Field of Classification Search ........................ None
See application file for complete search history.

(56) References Cited

U.S. PATENT DOCUMENTS

| 5,822,614 | A | 10/1998 | Kenton et al. | |
|---|---|---|---|---|
| 6,529,744 | B1 | 3/2003 | Birkler et al. | |
| 7,633,963 | B1 * | 12/2009 | Anderson et al. | 370/463 |
| 2003/0162562 | A1 * | 8/2003 | Curtiss et al. | 455/556 |

FOREIGN PATENT DOCUMENTS

| EP | 0 861 009 | 8/1998 |
|---|---|---|
| WO | WO 99/53621 | 10/1999 |
| WO | WO 00/74350 | 12/2000 |

* cited by examiner

*Primary Examiner* — Phuoc Doan
(74) *Attorney, Agent, or Firm* — AlbertDhand, LLP

(57) ABSTRACT

A mobile terminal capable of supporting a plurality of accessory functions with one or more accessories, the mobile terminal capable of supporting each accessory function in two or more modes, and each accessory storing a capability array indicative of the capabilities of the accessory. The mobile terminal comprises reading means for reading a capability array from an accessory; interpreting means for interpreting a capability array read by the reading means in accordance with a predefined format as including one or more fields, each field corresponding to an accessory function; identifying means for identifying a mode of an accessory function in dependence on the content of a field of the capability array, the field corresponding to the accessory function; and supporting means responsive to the identifying means for supporting the accessory function with the accessory in the mode identified by the identifying means.

23 Claims, 7 Drawing Sheets

FIG. 1

| System Block | | | | | | | | | | | |
|---|---|---|---|---|---|---|---|---|---|---|---|
| Address | Field | Value | Size | Bit 7 | Bit 6 | Bit 5 | Bit 4 | Bit 3 | Bit 2 | Bit 1 | Bit 0 | Notes |
| +0 | BlockID | | 1 byte | | | | | | | | | Block ID |
| +1 | DataLength | | 1 byte | | | | | | | | | Byte count from +2, parity byte not included |
| +2 | Acc_type high | | 1 byte | | | | | | | | | |
| | MasterType | | 6 bit | # | # | # | # | # | # | | | MasterType |
| | SubType MSB | | 2 bit | | | | | | | # | # | SubType high |
| +3 | Acc_type low | | 1 byte | | | | | | | | | |
| | SubType LSB | | 3 bit | # | # | # | | | | | | SubType low |
| | Acc_ID | | 5 bit | | | | # | # | # | # | # | Accessory identification number |
| +4 | Parity byte | | 1 byte | | | | | | | | | Odd parity for each bit |

FIG. 4

| Generic ID System Block | | | | | | | | | | | | |
|---|---|---|---|---|---|---|---|---|---|---|---|---|
| Address | Field | Value | Size | Bit 7 | Bit 6 | Bit 5 | Bit 4 | Bit 3 | Bit 2 | Bit 1 | Bit 0 | Notes |
| +0 | Block_ID | | 4 bits | | | | | # | # | # | # | Block ID |
| | Device_ID | | 12 bits | # | # | # | # | | | | | Device_ID |
| +2 | Resource_ID | | 1 byte | | | | | | | | | |
| +3 | Device_type | | 3 bits | | # | # | | | | | | Device type |
| | Spare | | 5 bits | # | # | # | | | | | | Spare |
| +4 | I/O_Inf | | 8 byte | | | | | | | | | |
| | | | 1 bit | | # | # | # | # | # | # | # | Feature active state (0/1) |
| | | | 7 bit | # | | | | | | | | Feature for I/O-pin (0...7) |
| +12 | I/O input/output | | 1 byte | | | | | | | | | "'1' = Output, '0' = Input" |

FIG. 5

| Resource_ID field ||
|---|---|
| Bit | Sub field |
| 0 | NBUS |
| 1 | FBUS |
| 2 | USB |
| 3 | Audio |
| 4 | Music playback |
| 5 | FM antenna |
| 6 | Spare |
| 7 | Spare |

FIG. 6

| Audio Block | | | | | | | | | | | | |
|---|---|---|---|---|---|---|---|---|---|---|---|---|
| Address | Field | Value | Size | Bit 7 | Bit 6 | Bit 5 | Bit 4 | Bit 3 | Bit 2 | Bit 1 | Bit 0 | Notes |
| +14 | Uplink sensitivity | | 5 bits | | | | # | | # | # | # | Uplink sensitivity (Mic Gain) |
| | | | 3 bits | # | # | # | | | | | | AEC table selection |
| +15 | Downlink volume | | 5 bits | | | | # | | # | # | # | Downlink sensitivity (Output Gain) |
| | | | 3 bits | # | # | # | # | | | | | Max output level |
| +16 | Enhancement Switchers | | 1 bit | | # | # | # | # | # | # | # | Up alwe on/off |
| | | | 1 bit | # | # | # | # | # | # | # | # | Down alwe on/off |
| | | | 2 bits | # | # | # | # | # | # | # | | Output switcher |
| | | | 1 bit | # | # | # | # | # | # | # | # | Mic on/off |
| | | | 2 bits | # | # | # | # | # | # | # | | DRC target value |
| | | | 1 bit | | | | | | | # | | Input impedance |
| +17 | Parametric wideb EQ | | 9 bytes | | | | | | | | | |
| +31 | Parity byte | | 1 byte | | | | | | | | | Odd parity for each bit over the whole block |

ACCESSORY FUNCTIONS

FIELD OF INVENTION

The present invention relates to a mobile terminal capable of supporting a plurality of accessory functions.

BACKGROUND TO THE INVENTION

There are many accessories available for mobile terminals today. For example, typical accessories include hands free headsets, hands free car kits, data cables for connecting to external devices such as personal computers and laptops, and camera attachments.

Each accessory can have a series of associated functions. For example, a hands free headset unit may include a microphone input as well as audio output. Furthermore, the audio output supported by the headset may be either mono audio or stereo audio depending on the capabilities of the headset. Alternatively, the accessory may be a data cable for connecting the mobile terminal to a laptop, where the data cable can provide input/output functions for the flow of data to and from the mobile terminal via the data cable.

An accessory is connected to a mobile terminal via a suitable connector or interface. The interface may be a direct wired interface or a wireless interface such as Bluetooth. Once the accessory is connected to the mobile terminal, the mobile terminal determines the functions provided by the accessory, and which must be supported by the mobile terminal. The detection of the accessory and determining the functions corresponding to the accessory is based on the reading an identification number associated with the accessory.

Each accessory stores an identification number which can be read by the mobile terminal. The identification number corresponds to a predetermined set of functions provided by the accessory and a mode of operation for each of those functions. These functions must be supported by the mobile terminal in the predetermined mode.

For example, the may be a hands free headset, the accessory functions may include the audio output capabilities of the earphones, and the mode for the audio output capabilities may be stereo audio output or mono audio output. Alternatively, the accessory function may be more specific such as microphone, and the mode may be either on or off.

The mobile terminal stores a list of accessory identification numbers together with a corresponding set of accessory functions and modes for each stored identification number. Any accessories with identification numbers that are not stored by the mobile terminal may not have their functions supported, be supported in the incorrect mode, or the accessory may not be recognised altogether.

FIG. 1 illustrates an example of a system block in which the identification number for an accessory is stored. The system block is an accessory control interface (ACI) software (SW) 1.0 system block. The system block comprises data stored by an accessory which is read by a mobile terminal.

The system block comprises five bytes of data divided into various fields, some of which are divided into sub-fields. These include BlockID (one byte), DataLength (one byte), Accessory_type_high (one byte), Accessory_type_low (one byte) and a parity byte.

The Accessory_type_high field comprises a Mastertype sub-field (6 bits) and SubType most significant bit sub-field (2 bits). The Accessory_type_low sub-field comprises a SubType least significant sub-bit field (3 bits) and an Accessory_ID sub-field (5 bits).

The identification number associated with an accessory is made up the Accessory_type_high field and Accessory_type_low field.

When an accessory using the system block illustrated in FIG. 1 is connected to a mobile terminal, the mobile terminal reads the identification number comprising the data in the Accessory_type_high field and the Accessory_type_low field. The mobile terminal then matches the read identification number with an identification number stored in the mobile terminal to determine the set of accessory functions and corresponding modes which are provided by the accessory and which should be supported by the mobile terminal.

Any accessory that has an identification number that is not stored in the mobile terminal, and therefore not matched by the mobile terminal, may either not be recognised, or the functions provided by the accessory may not be supported by the mobile terminal, at least in the correct mode.

As mobile terminals are generally manufactured and sold with a fixed list of accessory identification numbers, for any new accessories to work with an existing mobile terminal, which has a set list of identification numbers stored, the new accessories must use one of the identification numbers already stored in the mobile terminal. Otherwise, the mobile terminal will not recognise the new identification number. The new accessory is therefore limited to the specific set of accessory functions and associated modes defined by an existing identification number, even if the new accessory can provide new improved accessory functions or new combinations of accessory functions.

Furthermore, it is not possible to update the software or memory in a mobile terminal to include new identification numbers to support new accessories to overcome this problem once the mobile terminal has left the manufacturer.

There is therefore a need for an improved mobile terminal capable of supporting various accessory functions that at least partly mitigate some of the above problems.

SUMMARY OF INVENTION

According to one embodiment of the present invention there is provided a mobile terminal capable of supporting a plurality of accessory functions with one or more accessories, the mobile terminal capable of supporting each accessory function in two or more modes, and each accessory storing a capability array indicative of the capabilities of the accessory; the mobile terminal comprising: reading means for reading a capability array from an accessory; interpreting means for interpreting a capability array read by the reading means in accordance with a predefined format as including one or more fields, each field corresponding to an accessory function; identifying means for identifying a mode of an accessory function in dependence on the content of a field of the capability array, the field corresponding to the accessory function; and supporting means responsive to the identifying means for supporting the accessory function with the accessory in the mode identified by the identifying means.

The accessory function may correspond to a capability of an accessory. Furthermore, the mode may be a mode of operation.

Preferably, the capability array comprises at least one data block. The contents of the fields in the capability array may be bit values. And the predetermined format may comprise fields in adjacent bit positions.

The mobile terminal may comprises connecting means for connecting to an accessory. The connecting means may be an interface. The interface may be one of a wired interface, an infrared interface or a Bluetooth interface.

Preferably, the accessory function is one of a data bus function, an audio function, a music playback function, and an antenna function.

According to a further embodiment of the present invention, there is provided a method in a mobile terminal capable of supporting a plurality of accessory functions with one or more accessories, the mobile terminal capable of supporting each accessory function in two or more modes, and each accessory storing a capability array indicative of the capabilities of the accessory; the method comprising the steps of: reading a capability array from an accessory; interpreting a read capability array in accordance with a predefined format as including one or more fields, each field corresponding to an accessory function; identifying a mode of an accessory function in dependence on the content of a field of the capability array, the field corresponding to the accessory function; and supporting, in response to the step of identifying, the accessory function with the accessory in the mode identified.

According to a further embodiment of the invention, there is provided an accessory for a mobile terminal, the accessory being capable of providing a plurality of accessory functions and having storage means for storing a capability array indicative of the capabilities of the accessory, and wherein said capability array may be interpreted by a mobile terminal in accordance with a predefined format, the format comprising a plurality of fields, each field corresponding to an accessory function provided by the accessory, at least one field identifying a mode in which that accessory is capable of supporting that accessory function.

According to a further embodiment of the present invention, there is provided a method of operation of an accessory for a mobile terminal, the accessory being capable of providing a plurality of accessory functions and having storage means for storing a capability array indicative of the capabilities of the accessory, and wherein said capability array may be interpreted by a mobile terminal in accordance with a predefined format, the format comprising a plurality of fields, each field corresponding to an accessory function provided by the accessory, at least one field identifying a mode in which that accessory is capable of supporting that accessory function; the method comprising providing by means of such an accessory the capability array to a mobile terminal.

BRIEF DESCRIPTION OF DRAWINGS

For at better understanding of the present invention reference will now be made, by way of example only, to the accompanying drawings in which:

FIG. 1 illustrates a system block of the prior art;

FIG. 4 illustrates a system bock in an embodiment of the present invention;

FIG. 5 illustrates a resource identification field in an embodiment of the present invention;

FIG. 6 illustrates an audio block in an embodiment of the present invention;

DETAILED DESCRIPTION OF EMBODIMENTS

The present invention is described herein with reference to particular examples. The invention is not, however, limited to such examples. In particular, the invention is described by way of reference to an exemplary mobile terminal and accessories supporting the Nokia Pop-Port interface. However, the invention may be equally applicable to other suitably configured terminals, accessories and interfaces.

Various accessories are available for mobile terminals today. An accessory can connect to their mobile terminal via a suitable connector or interface. With some mobile terminals, a single generic interface can provide the connection to a variety of different accessories. One such example is the Pop-Port ACI (accessory control interface) system used in some Nokia mobile terminals.

The ACI bus is a single wire control bus used by Pop-Port accessories. The ACI bus can be used to control accessories and features such as control buttons and input/output (I/O) pins.

Figure 2:
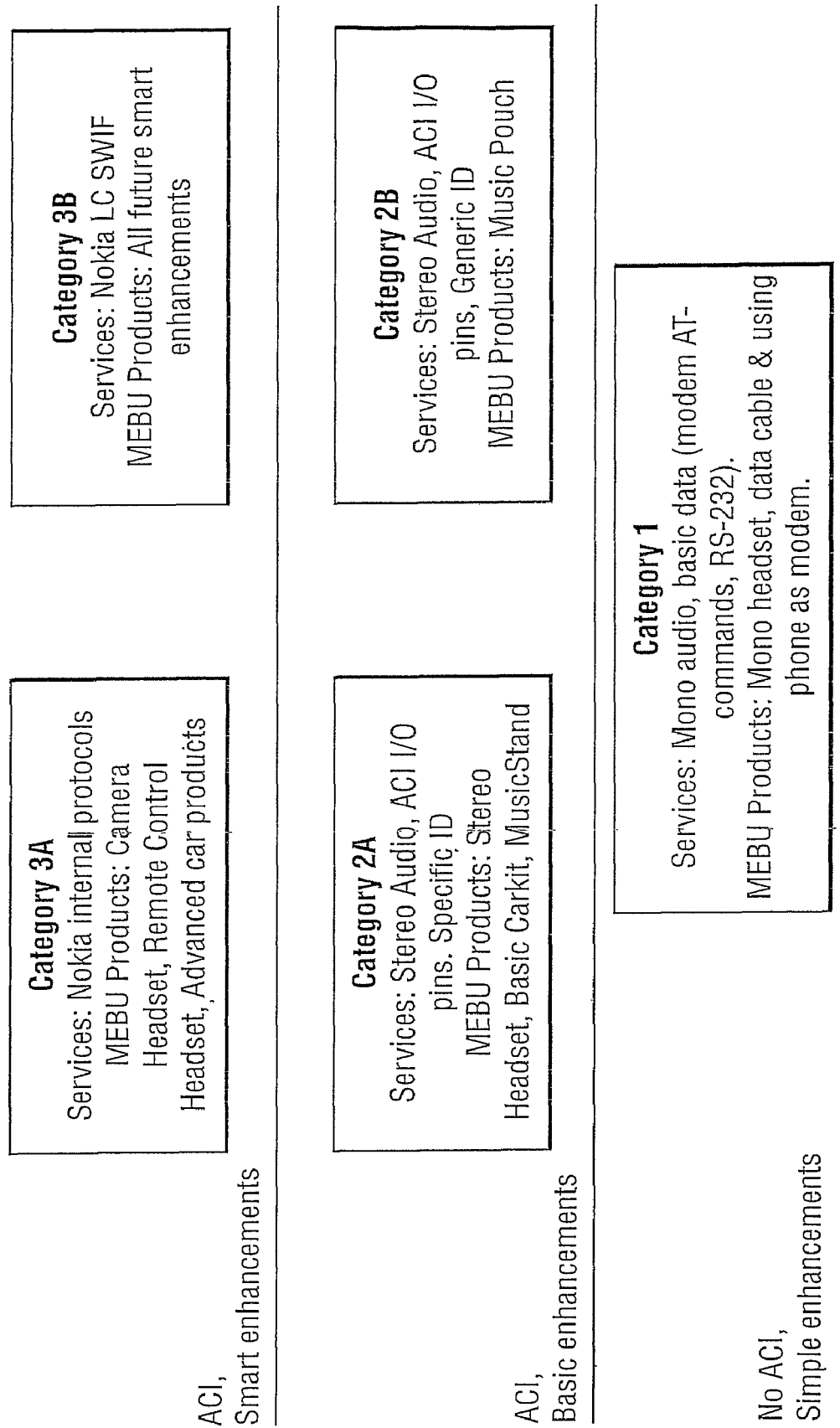
FIG. 2 illustrates categories of accessories.

FIG. 2 illustrates various Pop-Port accessories which have been divided into categories according to the capabilities of the accessory.

The capabilities of the accessories in categories 1, 2A and 3A are indicated by an identification number. The accessory stores an identification number which corresponds to a predefined set of accessory functions and associated modes for each function that are provided by the accessory and that should be supported by a mobile terminal. The identification number may comprise the MasterType and SubType fields described earlier with reference to FIG. 1.

When a category 1, 2A or 3A accessory is connected to a mobile terminal, the identification number is read by the mobile terminal. The mobile terminal stores a list of identification numbers together with an associated set of accessory functions for each identification number. The identification number from the accessory is matched with a one of the identification numbers stored in the mobile terminal and the mobile terminal provides support for the set of accessory functions in the appropriate mode associated with the matched identification number. Therefore, the identification number corresponds to a predefined set of accessory functions and associated modes for each accessory function.

Reference is now made to the category 2B and 3B accessories, which comprise accessories in embodiments of the present invention.

Figure 3:
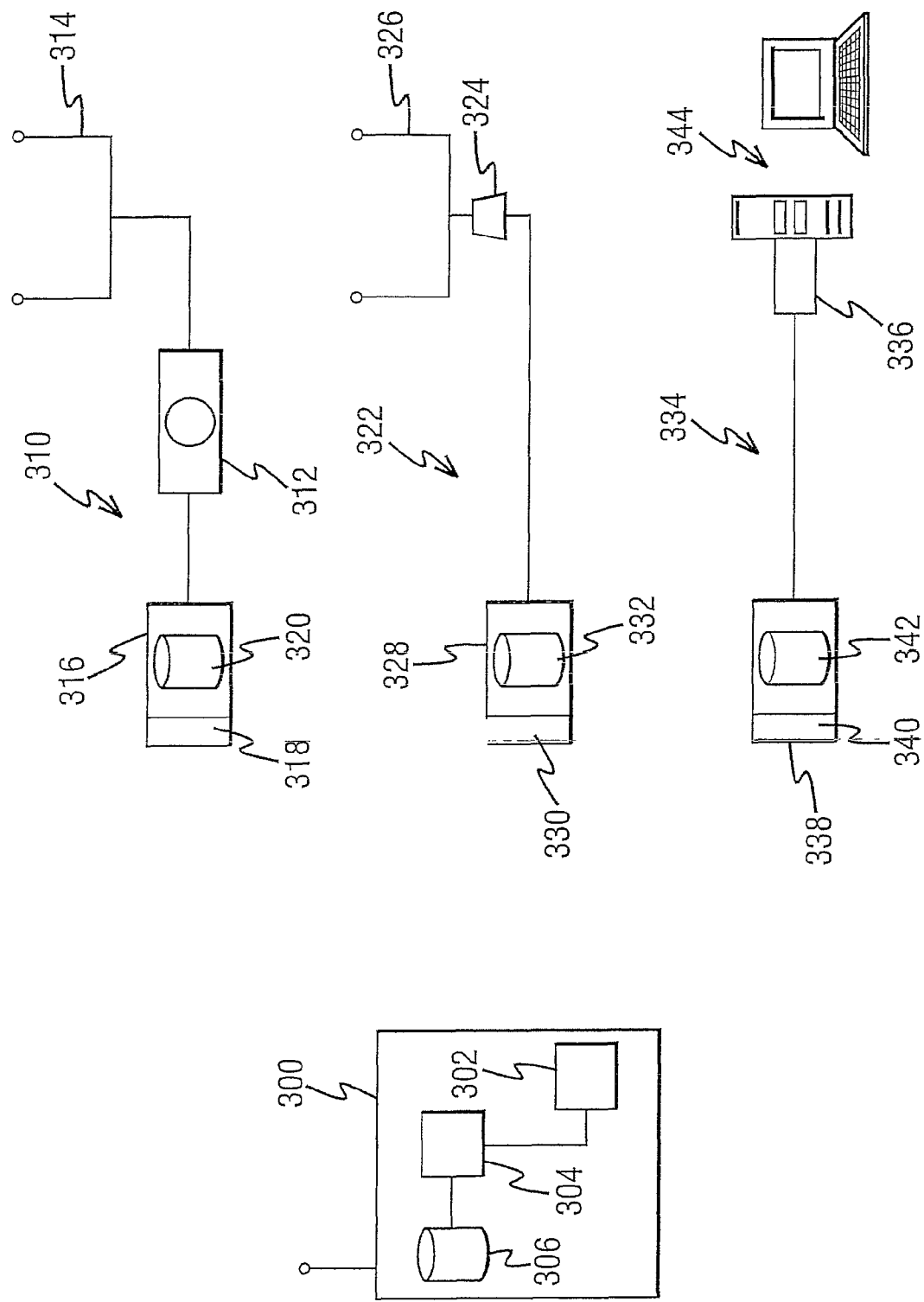
FIG. 3 illustrates a mobile terminal and accessories in an embodiment of the present invention.

FIG. 3 illustrates a mobile terminal and examples of category 2B and 3B accessories in a preferred embodiment of the present invention.

Mobile terminal 300 comprises an interface 302, which is connected to a processing unit 304. The mobile terminal 300 also comprises a memory 306 connected to the processing unit 304.

FIG. 3 also illustrates three accessories: a camera headset 310, a hands free headset 322, and a data cable 334.

Each of the accessories in FIG. 3 comprises a connector body, which includes an interface and memory. The interface connects the accessory to the interface 302 on the mobile terminal. It should be appreciated that the connection between the accessory and the mobile terminal may be a wired connection or a wireless connection such as infrared Bluetooth. In the case of a wireless connection, the interface on the accessory may be an infrared transmitter/receiver and the interface on the mobile terminal may also be an infrared transmitter/receiver.

The camera headset 310 comprises a connector body 316, which includes an interface 318 and a memory 320. The camera headset 310 also comprises a camera unit 312 and earphones 314. The camera unit 312 provides camera functions and may be used to capture images. The earphones may provide hands free functions, including audio output.

The hands free headset 322 comprises a connector body 328, which includes an interface 330 and memory 332. The hands free headset 322 further comprises a microphone 324 and earphones 326. The microphone 324 may be used to input voice data into a mobile terminal connected to the hands free headset 322. The microphone may have adjustable gain levels. The earphones may provide basic audio output from a mobile terminal, for example during a call, or more advanced audio output, for example music from a radio built into a mobile terminal. The audio output may have different modes such as mono audio or stereo audio depending on the capabilities of the hands free headset 322.

The data cable 334 comprises a connector body 338, which includes an interface 340 and memory 342. The data cable 334 also comprises a further connector 336, which may be used to connect the data cable 334 to a personal computer 344 or other similar device such as a laptop or personal digital assistant. The data cable may be used to transfer data to and from a mobile terminal or provide modem functions depending on the capabilities of the data cable 334. The data cable may support various data transfer standards, such as universal serial bus (USB).

The capabilities of the accessories in embodiments of the present invention may be defined using a generic identification system. Instead of using an identification number corresponding to a fixed set of accessory functions and modes, individual fields of a generic data block or array may be used to define corresponding accessory functions and the data in each field may define the mode of the accessory function corresponding to the field. This generic data block may be stored in the memory in each accessory.

In a preferred embodiment of the present invention, the generic identification system uses a generic identification system block and an audio block. The fields of the generic identification system block and audio block may define accessory functions supported by the accessory, and the data in each field may define the mode for the accessory function. For example, the accessory function may be the audio output capabilities of the accessory and the mode may be stereo audio.

Before describing the generic identification system block in more detail, some of the accessory functions that may be provided by an accessory and supported by a mobile terminal are described.

The following are examples of some general accessory functions that may be provided by an accessory and supported by a mobile terminal:

Audio input functions. These define the audio input functions of the accessory, such as whether the accessory provides a microphone input and the sensitivity of the microphone input.

Audio output functions. These define the audio output functions. For example, the audio output may have modes of on or off. For a hands free headset, the audio output will typically have mode of on, but for a data cable, it will have a mode of off. If audio output is on, the audio output mode may be mono audio or stereo audio. The audio output functions may also define when the mobile terminal should switch on the audio amplifier and when to enable audio to the accessory.

I/O input functions from the accessory. These include functions supported by an accessory such as car ignition sensing in an in-car accessory, volume controls, and power supply connections.

The interface to a Pop-Port interface can have 8 I/O pins, which can be configured separately as inputs or outputs, each providing different functions between the mobile terminal and the accessory.

I/O output functions to an accessory. These include functions supported by an accessory such as muting the car radio in an in-car accessory, switching the battery charger on and off, switching the handset audio on and off, and providing signals for a modem connection.

Voltage output function, providing a power source for an accessory. This may be varied accordingly depending on the requirements of the accessory.

NBUS, which is a serial data bus based on RS-232 using 8-bit characters.

Universal serial bus (USB) provides data transfer functions.

The mode of each accessory function is defined by the data in specific fields in a generic identification system block, and, if appropriate, an audio block.

FIG. 4 illustrates a generic identification system block. The generic identification system block comprises various fields each of which may be subdivided into sub-fields. The generic identification system block illustrated in FIG. 4 comprises a Block_ID field (4 bits), a Device_ID field (12 bits), a Resource_ID field (1 byte), a Device type field (3 bits), a spare field (5 bits), an I/O_information field (1 byte), and an I/O_input/output field (1 byte). Some of these fields may be divided into sub-fields.

Each field or sub-field may correspond to an accessory function, and the data stored in the field identifies the mode of the accessory function.

For example, the I/O_information field has a first bit corresponding to whether the I/O function for a given I/O pin in the accessory interface is active. A bit value of "1" in the first bit can be used to indicate that an I/O function is active for the given pin. The I/O_information field also has a further seven bits to define the specific function for the given I/O pin, such as a power supply or data function. The I/O_input/output field comprises 8 bits, with one bit corresponding to each of the 8 pins to indicate whether the function for each pin is an input or an output function.

The Block_ID field is a 4 bit field which is mainly used to restrict the use of some accessories in older mobile terminals. The Block_ID field may be used to define the version of the generic identification system block, thereby allowing different versions of the generic identification system block having different field formats to be defined in the future.

The Device_ID field is a 12 bit field which defines an individual identity number for an accessory. The device ID enables the management of forward and backward compatibility between accessories and terminals.

The Resource_ID field is an 8 bit field which defines some of the functions provided accessory and supported by a mobile terminal. The Resource_ID field is divided into 8 sub-fields in each of the 8 bit positions. A bit value in each bit position indicates the mode of the accessory function corresponding to that bit position, which is provided by the accessory and requiring support by the mobile terminal.

FIG. 5 illustrates in more detail the sub-fields and their corresponding accessory functions for each bit position of the Resource_ID field.

Bit 0 corresponds to the Nokia BUS (NBUS) sub-field. A bit value of "1" in bit position 0 indicates that NBUS function is provided by the accessory. The NBUS function may be provided in a data cable such as the data cable 334 illustrated in FIG. 3.

Bit 1 corresponds to the FBUS. A bit value of "1" in bit position 0 indicates that NBUS function is provided by the accessory. If both bit position 0, corresponding to NBUS, and bit position 1 both have the value of "1", the mobile terminal may change the mode of the bus using an appropriate command between NBUS and FBUS.

Bit 2 corresponds to the universal serial bus (USB). A bit value of "1" in bit position 2 indicates that USB function is provided by the accessory and USB hand shaking may start. The USB function and NBUS/FBUS are mutually exclusive. Therefore, if bit position 2 has a value of "1", then bit positions 0 and 1 must have a value of "0".

Bit 3 corresponds to the audio functions the accessory. When bit position 3 has a value of "1", the accessory supports audio functions. Specific audio functions are provided in a further data block referred to as an audio block. Therefore, bit position 3 having a value of "1" also indicates that an audio block is present. The audio block and functions defined therein are discussed in more detail below.

Bit 4 corresponds to music playback, and defines whether an accessory is capable of playing back music, for example from a radio or MP3 function in the mobile terminal. A bit value of "1" in bit position 4 indicates that music playback is provided by the accessory. For example, this may be provided via the earphones in the hands free headset 322 illustrated in FIG. 3.

Bit 5 corresponds to an FM antenna function, where the cable or wire of the accessory may be used as an antenna for a radio function in the mobile terminal. A bit value of "1" in bit position 5 indicates that the mobile terminal may utilise the cable in the accessory for as an FM antenna.

Bits 6 and 7 are spare and may be used for other functions.

In a further embodiment of the present invention, when the bit 3 of the Resource_ID field has a value of "1", then the accessory may provide audio functions defined in a further data block referred to as an audio block. The audio block is illustrated in FIG. 6.

The audio block comprises various fields, each of which may be divided into sub-fields. The audio block illustrated in FIG. 6 comprises an uplink sensitivity field (8 bits), a downlink volume field (8 bits), and enhancement switchers field (8 bits), a parametric wideband equalisation field (8 bits). The bit value in each field or sub-field where appropriate, indicates the mode of the accessory function corresponding to that field or sub-field, which is provided by the accessory and requiring support by the mobile terminal.

The uplink sensitivity field comprises a 5 bit sub-field corresponding to an uplink sensitivity, or microphone gain, and a 3 bit sub-field corresponding to the AEC selection table.

The downlink volume field comprises a 5 bit sub-field corresponding to the downlink sensitivity, or output gain, and a 3 bit sub-field corresponding to the maximum output level.

The enhancement switches field comprises: a 1 bit sub-field corresponding to up alwe on/off; a 1 bit sub-field corresponding to down alwe on/off; a 2 bit sub-field corresponding to the output switcher; a 1 bit sub-field corresponding to microphone on/off; a 2 bit sub-field corresponding to a DRC target value; and a 1 bit sub-field corresponding to the input impedance.

A bit value of "1" in the any of the on/off sub-fields indicates that the function corresponding to that sub-field is "on". A bit value of "0" in the any of the on/off sub-fields indicates that the function corresponding to that sub-field is "off".

A preferred embodiment of the present invention will now be described in more detail with reference to the flow chart of FIG. 7 and with reference to the mobile terminal and accessories illustrated in FIG. 3. It should be appreciated that the following method is applicable to any suitably configured accessory. The reference to a hands free handset 322 in this method is by way of example only.

Firstly, an accessory, such as the hands free handset 322, is connected to the mobile terminal 300. The connection is made via the interface 330 of the headset and 302 and the interface 302 of the mobile terminal. This may be a wired connection or a wireless connection, such as via Bluetooth. This is represented in step 700 in FIG. 7.

The hands free headset 322 stores in memory 332 a data block in the form of a generic identification system block and an audio block. The mobile terminal reads these blocks using the processing unit 304. This is represented in step 702 in FIG. 7.

The data read from the generic identification system block and the audio block is interpreted by the processing unit 304 in a predefined format that comprises a number of fields. Each field may correspond to a specific accessory function. For example, the audio block may be interpreted as including all the fields illustrated in the audio block in FIG. 6, which includes a field corresponding to the downlink sensitivity (audio output gain) in the accessory and a field corresponding to microphone on/off. This is represented in step 704 in FIG. 7.

For each field that is associated with an accessory function, a mode for that accessory function is identified by the processing unit 304. The mode for the accessory function is dependent on the data in the corresponding field.

For example, data may be present in the downlink sensitivity field of the audio block. Therefore, the data in the downlink sensitivity field may correspond to a mode for the downlink sensitivity function, which in this case is a specific downlink sensitivity value.

In another example, as the headset 322 includes a microphone 324, the data present in the microphone on/off field may have a bit value of "1" to indicate that the mode for the microphone on/off is "on". However, if the accessory does not include a microphone function, such as the camera headset 310 or data cable 334, then the data in this field may have a bit value of "0" to indicate that the mode for the microphone on/off function is "off".

In yet another example, the headset 322 may provide an FM antenna function. Therefore, the data in the FM antenna field within the Resource_ID field of the generic identification system block may have a bit value of "1". The bit value of "1" indicates that the mode for the FM antenna function is active.

Figure 7:
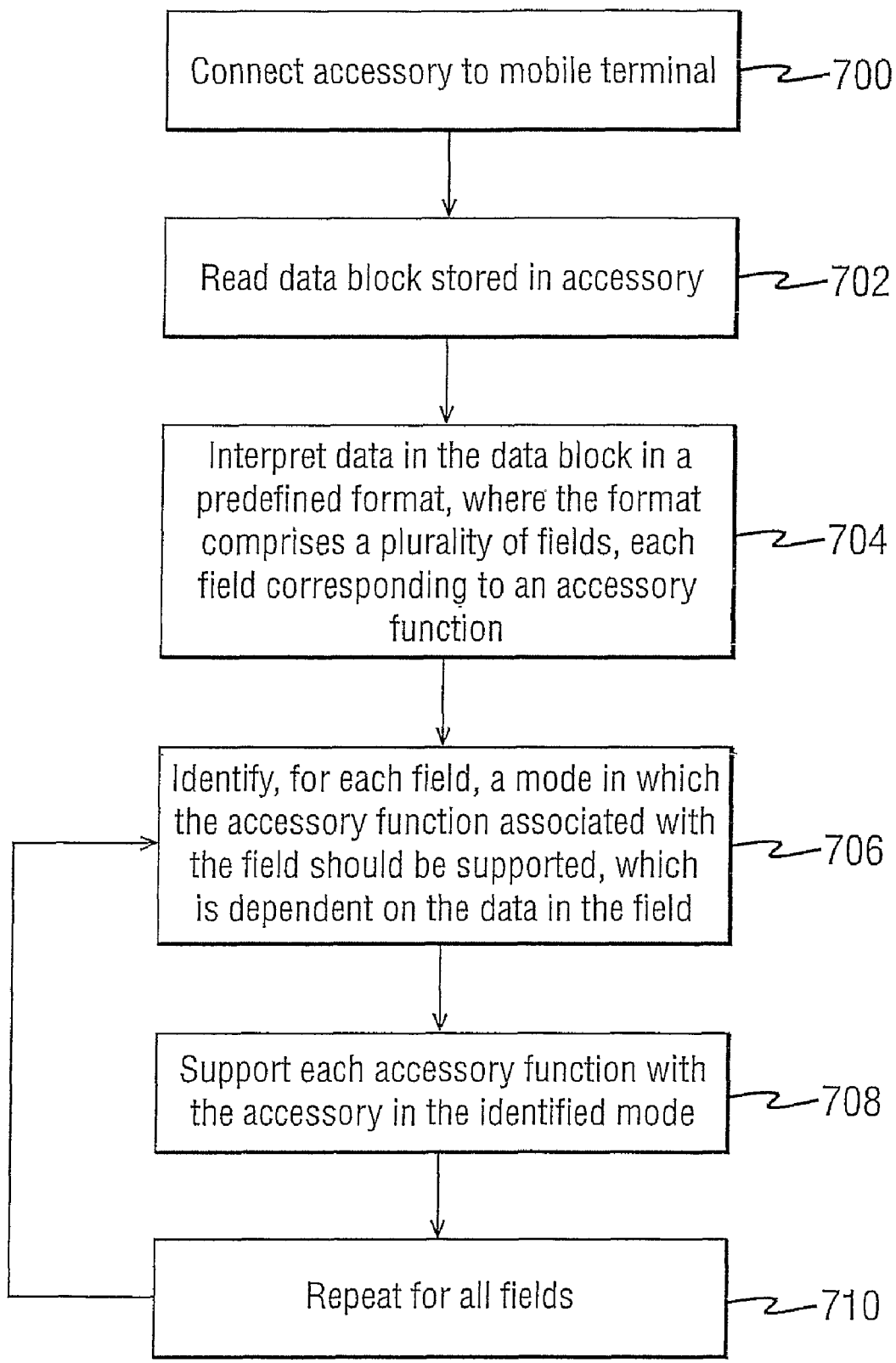
FIG. 7 illustrates a flow diagram of an embodiment of the present invention.

The identifying of the mode of an accessory function is represented in step 706 in FIG. 7.

Once the mode for an accessory function is identified, the mobile terminal 300 is configured to support the accessory function with the accessory in the mode identified. For example, if the mode identified for the microphone function is "on", then the mobile terminal 300 may be configured to support audio input signals from the accessory via the interface 302. This is represented in step 708 in FIG. 7.

The steps of identifying and supporting a mode of an accessory function may then be repeated for all the fields in the data block read from the accessory that correspond to accessory functions. This is represented in step 710 in FIG. 7.

In embodiments of the present invention, the capabilities or functions of an accessory may be defined using a generic identification system. Therefore, the problems associated with using an identification number corresponding to a fixed set of accessory functions and modes are overcome as individual fields of a generic data block may be used to define accessory functions and the data in each field may define the mode of the accessory function.

Therefore, it is possible to develop new accessories with new functions, or at least new combinations of functions, that were not previously possible using an identification number.

Existing mobile terminals would be able to support new accessories and their functions as long as they are able to interpret and identify the data in the data blocks in accordance with embodiments of the present invention.

Whilst the foregoing embodiments have been described with reference to a generic identification system block and an optional audio block, the invention is not limited to these specific blocks. A person skilled in the art will appreciate that any type of data block or array comprising individual fields each corresponding to separate accessory functions may be used instead.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A mobile terminal capable of supporting a plurality of accessory functions with one or more accessories, the mobile terminal capable of supporting each accessory function in two or more modes, and each accessory storing a capability array indicative of the capabilities of the accessory; the mobile terminal comprising:
   reading means for reading a capability array from an accessory;
   interpreting means for interpreting a capability array read by the reading means in accordance with a predefined format as including one or more fields, each field corresponding to an accessory function;
   identifying means for identifying a mode of an accessory function in dependence on the content of a field of the capability array, the field corresponding to the accessory function; and
   supporting means responsive to the identifying means for supporting the accessory function with the accessory in the mode identified by the identifying means.

2. A mobile terminal as claimed in claim 1, wherein the accessory function corresponds to a capability of an accessory.

3. A mobile terminal as claimed in claim 1, wherein the mode is a mode of operation.

4. A mobile terminal as claimed in claim 1, wherein the capability array comprises at least one data block.

5. A mobile terminal as claimed in claim 1, wherein the contents of the fields in the capability array are bit values.

6. A mobile terminal as claimed in claim 1, wherein the predetermined format comprises fields in adjacent bit positions.

7. A mobile terminal as claimed in claim 1 wherein the mobile terminal comprises connecting means for connecting to an accessory.

8. A mobile terminal as claimed in claim 7, wherein the connecting means is an interface.

9. A mobile terminal as claimed in claim 8, wherein the interface is one of a wired interface, an infrared interface or a Bluetooth interface.

10. A mobile terminal as claimed in claim 1 wherein the accessory function is one of a data bus function, an audio function, a music playback function, and an antenna function.

11. A method in a mobile terminal capable of supporting a plurality of accessory functions with one or more accessories, the mobile terminal capable of supporting each accessory function in two or more modes, and each accessory storing a capability array indicative of the capabilities of the accessory; the method comprising the steps of:
   reading a capability array from an accessory;
   interpreting a read capability array in accordance with a predefined format as including one or more fields, each field corresponding to an accessory function;
   identifying a mode of an accessory function in dependence on the content of a field of the capability array, the field corresponding to the accessory function; and
   supporting, in response to the step of identifying, the accessory function with the accessory in the mode identified.

12. An accessory for a mobile terminal, the accessory being capable of providing a plurality of accessory functions and having storage means for storing a capability array indicative of the capabilities of the accessory, and wherein said capability array may be interpreted by a mobile terminal in accordance with a predefined format, the format comprising a plurality of fields, each field corresponding to an accessory function provided by the accessory, at least one field identifying a mode in which that accessory is capable of supporting that accessory function.

13. An accessory for a mobile terminal as claimed in claim 12, wherein each accessory function corresponds to a capability of the accessory.

14. An accessory for a mobile terminal as claimed in claim 12, wherein the mode is a mode of operation.

15. An accessory for a mobile terminal as claimed in any of claim 12, wherein the capability array comprises at least one data block.

16. An accessory for a mobile terminal as claimed in any of claim 12, wherein the contents of the fields in the capability array are bit values.

17. An accessory for a mobile terminal as claimed in any of claim 12, wherein the predetermined format comprises fields in adjacent bit positions.

18. An accessory for a mobile terminal as claimed in any of claim 12, wherein the accessory comprises connecting means for connecting to a mobile terminal.

19. An accessory for a mobile terminal as claimed in claim 18, wherein the connecting means is an interface.

20. An accessory for a mobile terminal as claimed in claim 19, wherein the interface is one of a wired interface, an infrared interface or a Bluetooth interface.

21. An accessory for a mobile terminal as claimed in claim 12, wherein the accessory function is one of a data bus function, an audio function, a music playback function, and an antenna function.

22. An accessory for a mobile terminal as claimed in claim 12, wherein the accessory is one of a camera headset, a hands free headset, and a data cable.

23. A method of operation of an accessory for a mobile terminal, the accessory being capable of providing a plurality of accessory functions and having storage means for storing a capability array indicative of the capabilities of the accessory, and wherein said capability array may be interpreted by a mobile terminal in accordance with a predefined format, the format comprising a plurality of fields, each field corresponding to an accessory function provided by the accessory, at least one field identifying a mode in which that accessory is capable of supporting that accessory function; the method comprising providing by means of such an accessory the capability array to a mobile terminal.

* * * * *